US010300991B2

(12) United States Patent
Baek

(10) Patent No.: US 10,300,991 B2
(45) Date of Patent: May 28, 2019

(54) VARIABLE TRIMARAN USING NATURAL POWER

(71) Applicant: Yun Kang Baek, Seoul (KR)

(72) Inventor: Yun Kang Baek, Seoul (KR)

(73) Assignee: MJC CO., LTD., Seoul (KR)

( * ) Notice: Subject to any disclaimer, the term of this patent is extended or adjusted under 35 U.S.C. 154(b) by 0 days.

(21) Appl. No.: 15/535,028

(22) PCT Filed: Dec. 9, 2015

(86) PCT No.: PCT/KR2015/013442
§ 371 (c)(1),
(2) Date: Jun. 9, 2017

(87) PCT Pub. No.: WO2016/093614
PCT Pub. Date: Jun. 16, 2016

(65) Prior Publication Data
US 2017/0320544 A1    Nov. 9, 2017

(30) Foreign Application Priority Data

Dec. 9, 2014    (KR) ........................ 10-2014-0175675

(51) Int. Cl.
*B63B 1/14*    (2006.01)
*B63B 15/02*    (2006.01)
(Continued)

(52) U.S. Cl.
CPC ................ *B63B 1/14* (2013.01); *B63B 15/02* (2013.01); *B63H 9/04* (2013.01); *H02S 20/30* (2014.12); *B63B 2001/145* (2013.01)

(58) Field of Classification Search
CPC .... B63B 1/00; B63B 1/10; B63B 1/14; B63B 7/04; B63B 15/02; B63B 35/00; B63H 9/04; B63H 9/06
(Continued)

(56) References Cited

U.S. PATENT DOCUMENTS 4,807,551 A    2/1989 Ace
5,107,783 A *  4/1992 Magazzu .................. B63B 1/14
                                                      114/61.15
(Continued)

FOREIGN PATENT DOCUMENTS

EP          2298637 A1    3/2011
KR    10-2011-0089957 A   8/2011
(Continued)

*Primary Examiner* — Lars A Olson
(74) *Attorney, Agent, or Firm* — IPLA P.A.; James E. Bame

(57) ABSTRACT

A variable trimaran that uses natural power has an outer hull, which is capable of ensuring stability with respect to a center hull in the middle thereof. The variable trimaran can be selectively expanded and contracted in the horizontal and vertical directions thereof. The variable trimaran includes a sail unit, which uses wind power, and a solar power generation unit so as to enable efficient long-term sailing without the use of fossil fuel. To this end, a horizontal and vertical adjustment units are provided for adjusting the position of the outer hull, and the solar power generation unit and the wind power sailing unit are used such that the position of the outer hull can be freely adjusted with respect to the center hull and efficient long-term sailing is enabled without the supply of an oil energy source due to the use of sunlight and wind power as power sources.

15 Claims, 7 Drawing Sheets

(51) Int. Cl.
*B63H 9/04* (2006.01)
*H02S 20/30* (2014.01)

(58) Field of Classification Search
USPC .............. 114/39.27, 39.28, 61.15, 61.18
See application file for complete search history.

(56) References Cited

U.S. PATENT DOCUMENTS 6,003,458 A * 12/1999 Valliere .................... B63B 1/14
  114/61.18
8,695,520 B1 * 4/2014 Berte' ...................... B63B 1/14
  114/39.27

FOREIGN PATENT DOCUMENTS

| KR | 10-2013-0006931 A | 1/2013 |
|---|---|---|
| KR | 10-2013-0046674 A | 5/2013 |
| KR | 10-1279744 B1 | 6/2013 |
| KR | 10-2013-0094077 A | 8/2013 |
| KR | 10-2014-0042019 A | 4/2014 |

* cited by examiner

130 : 130a, 130b
140 : 140a, 140b

VARIABLE TRIMARAN USING NATURAL POWER

TECHNICAL FIELD

The present invention relates to a trimaran, and more particularly, to a variable trimaran using natural power, which has an outer hull which is capable of ensuring stability with respect to a center hull in the middle thereof and can be selectively expanded and contracted in the horizontal and vertical directions thereof, and which is provided with a sail unit using wind power and a solar power generation unit so as to enable efficient long-term sailing without the use of fossil fuel.

BACKGROUND ART

Many researches have been conducted regarding the stability of boats, and the most important thing in arranging many parts in boats is ensuring the stability of hulls.

All designs of boats focus on ensuring stability in the forward and backward directions (pitch) and stability in the horizontal direction (rolling), which are the important factors in the stability, and the most important factor in the rolling stability is a shape of a floating body such as a hull.

In general, the morphological stability of a boat is influenced most by the center of gravity and the center of buoyancy. To ensure such stability, boats are divided into a monohull, a catamaran, and a trimaran according to the shapes of their hulls.

From among various kinds of boats classified according to morphological characteristics as described above, the trimaran has many floating bodies in the hull and thus is easiest to ensure stability and has stability.

The trimaran has high stability, but occupies more spaces than the other boats due to an extension floating body extended in a lengthwise direction when it is anchored at a dock, and thus has many problems in use.

To solve the disadvantage of the trimarans, trimarans have been developed to have outer hulls which are installed at the left and right sides and can be expanded and contracted arbitrarily, and to maximize efficiency of space utilization.

As a related-art trimaran, Korean Patent Publication No. 10-2013-0046674 discloses "Trimaran Boat With the Extension Foldable Buoyance." This related-art trimaran can have its left and right extension floating bodies folded when it is docked at a harbor, and thus occupies less spaces, and also, can have the left and right expansion floating bodies expanded when it sails, and thus has an advantage of minimizing rolling.

However, the above-described related-art trimaran has not overcome disadvantages caused by the large overall width thereof, that is, poor performance in navigating and turning to change a direction when it sails, and a high possibility that the boat is overturned when it quickly turns since an auxiliary hull at one side floats off from a water surface.

Therefore, there is a demand for a technique for a trimaran for enhancing navigation performance and turning performance when its direction is changed, and increasing stability when it quickly turns, such that many people can easily and safely use the trimaran.

Meanwhile, various kinds of boats including trimarans, which can use wind power and solar power as driving power as oil which is a fossil fuel has run out, have been developed and distributed.

As related-art technology described above, Korean Patent Registration No. 10-1279744 discloses "Multi-functional Boat Using Solar and Wind Energy," and relates to a multi-functional boat using solar and wind power energy, which includes a manual driving unit and an automatic driving unit.

However, the related-art technology may produce power using a blade or drive by directly driving propellers, or may use power by charging a battery, and also, uses a solar cell panel as an auxiliary element. Therefore, it is greatly doubted whether the boat of this configuration can sail in the ocean without any assistance of an auxiliary power source.

In addition, Korean Patent Publication No. 10-2013-94077 discloses "Hybrid Boat Using Wind Power and Solar Energy as Driving Power." This invention is characterized of attaching a power generation solar cell plate to a surface of a sail made of plastic. However, this configuration has disadvantages that it is not clear how a solar power generation cell is mounted on the surface of the plastic sail ,and it is difficult to apply this configuration in practice.

DETAILED DESCRIPTION OF THE PRESENT DISCLOSURE

Technical Objects

The present invention has been developed in order to solve the above-described problems, and aims at providing a variable trimaran using natural power, which has a center hull and an outer hull, and can arbitrarily adjust an ascending movement and a descending movement of the outer hull in the vertical direction, and simultaneously, can freely expand and contract the outer hull in the horizontal direction, such that sailing can be performed even when high waves are generated, and optimal boarding comfort of passengers can be guaranteed.

In addition, the present invention aims at providing a variable trimaran using natural power, which uses sunlight and wind power as a power source and thus is configured to enable efficient long-term sailing without supply from an oil energy source.

In addition, the present invention aims at providing a variable trimaran using natural power, which can always obtain optimal natural power by adjusting an angle of a solar power generation unit according to a movement of the sun, and adjusting an angle of a wind power sail unit according to an intensity of wind power, such that it can be driven efficiently in spite of various change in an environment.

Technical Solving Means

To achieve the above-described objects, a variable trimaran using natural power according to the present invention has a center hull having a deck, and an outer hull located at the side of the center hull.

In addition, the variable trimaran may include: a horizontal adjustment unit for adjusting the location of the outer hull in the horizontal direction of the center hull by adjusting a location of a side deck bar of the deck in a horizontal direction; a vertical adjustment unit for adjusting the vertical location of the outer hull with respect to a water surface; a solar power generation unit which is installed on the deck of the center hull, and includes a solar power generator, a longitudinal angle adjustment unit for adjusting a longitudinal angle of the solar power generator, and a transverse angle adjustment unit for adjusting a transverse angle of the solar power generator; and a wind power sail unit which includes a mast vertically disposed to face a front part of the deck, a boom perpendicularly contacting each of the lower ends of the mast and disposed to be horizontal to the deck, and configured to be folded, and a main sail and a boom sail fastened to the mast and the boom, respectively.

The horizontal adjustment unit may include: a center shaft which is installed in a longitudinal direction of the center hull, and is rotated by a center shaft driving motor; a power transmission unit which transmits a rotational force of the center shaft; a pinion shaft which is installed to be perpendicular to the center shaft, and is rotated by receiving the rotational force of the power transmission unit and has an electrically-driven gear integrally formed with an end thereof; a driving shaft which has a driving gear engaged with the electrically-driven gear and is rotated; and a guide bar which linearly moves along the driving shaft according to the rotation of the driving shaft, and has an end integrally connected with the side deck bar.

Preferably, the pinion shaft may be divided into a first pinion shaft and a second pinion shaft connected to both sides of the power transmission unit, and the driving shaft may be divided into a first driving shaft engaged with the electrically-driven gear of the first pinion shaft, and a second driving shaft engaged with the second pinion shaft.

Preferably, the driving shaft may have a screw thread formed along the outer circumference thereof, and the guide bar may have a screw thread formed along the inner circumference thereof, and thus the guide bar may linearly move along the driving shaft due to securing by means of the screw thread.

In addition, the vertical adjustment unit may include: a vertical adjustment bar which has a moving roller formed thereon to freely move along a guide rail formed on the lower side of the side deck bar; a vertical control bar which has one end hingedly fixed to one side of the side deck bar by a pin fixing unit, and has the other end of the vertical adjustment bar fixed thereto; a buffering unit which has one end hingedly coupled to the other end of the vertical control bar and the other end fixed to the outer hull 3 so as to absorb an external shock.

A vertical control wire installed along the guide rail may be connected to the center of the moving roller, and a vertical height of the outer hull is adjusted by winding or unwinding the vertical control wire.

In addition, the vertical adjustment unit may include: an adjustment bar which has one end hingedly coupled to one side of the side deck bar by means of an upper hinge, and has the other end hingedly coupled to one side of the outer hull by means of a lower hinge; and a buffering unit which is disposed on the lower portion of the side deck bar to absorb an external shock.

Preferably, the buffering unit may be configured by one of a shock absorber or a spring.

The trimaran 1 may further include an underwater buffering unit formed on the lower portion of the outer hull in the form of a wing widely spread toward the water surface, and a surfing panel of a plate shape.

The solar power generator may include: a power generation module for producing power according to irradiation of sunlight; a frame for fixing the exterior of the power generation module; and a vertical shaft which has an upper portion integrally fixed to the lower portion of the power generation module or the frame, and a lower portion hingedly fixed.

In addition, the frame may further include a push-pull bar protruding from a front frame thereof, and the longitudinal angle adjustment unit may be configured to linearly move the push-pull bar using the rotational force of a longitudinal direction driving motor.

Preferably, the longitudinal angle adjustment unit may include: a driving shaft connected to the longitudinal direction driving motor; a power transmission unit having a gear structure so as to transmit a rotational force of the driving shaft; a first universal joint connected to the power transmission unit to transmit the rotational force; and a second universal joint which is connected with the first universal joint by means of a connection bar, and is fastened to the push-pull bar by means of a screw thread according to rotation to linearly move the push-pull bar.

The transverse angle adjustment unit may include: a transverse control bar which has a vertical fixing unit installed thereon in the vertical direction, the lower portion of the vertical shaft being hingedly fixed to the vertical fixing unit; a guide bar protruding from an end of the transverse control bar to be perpendicular to the transverse control bar; and a transverse bar fastened to the guide bar to be perpendicular to the guide bar, and the transverse angle of the solar power generator fixed to the vertical shaft of the vertical fixing unit may be adjusted by rotating the transverse control bar by linearly moving the transverse bar using a rotational force of a transverse direction driving motor.

Preferably, the transverse angle adjustment unit may further include: a driving shaft connected to the transverse direction driving motor; and a universal joint connected to the driving shaft and having a transverse rotation protrusion formed at an end thereof, and the transverse bar may further include a transverse push-pull bar fastened by means of a screw thread by the rotation of the transverse rotation protrusion.

The mast of the wind power sail unit may include: a pair of main shafts which are symmetrical to each other, have a main sail guide sliding along a sail guide rail formed inside and integrally formed with the main sail by means of a knot hole, have an upper guide roller and a lower guide roller formed on the outer surface thereof to guide a main sail adjustment wire for adjusting an ascending movement of the main sail, and are fixed to the deck by means of a deck fixing instrument formed at the lower portion thereof; and an upper shaft which is configured to integrally fix the upper ends of the pair of main shafts, and have a mast fixing instrument formed at both ends thereof to fix a main shaft fixing wire.

The boom of the wind power sail unit may include: a boom deck fixing instrument fixed to the deck; and a boom shaft which has a rotation fastening instrument formed at an end thereof to be rotatably fastened to the boom deck fixing instrument, and has a roller guide rail formed on one surface thereof and a boom sail guide roller moving along the roller guide rail and fastened to the boom sail.

The main sail may have side surface hanger loops 431 to be fixed to the knot holes of the main sail guide, and the boom sail may further include side surface fixing loops to be connected with the side surface hanger loops of the main sail, and lower end fixing loops to be fastened to the boom sail guide rollers.

The main shaft may further include a boom guide rail formed on the outer surface thereof, and the boom may further include a boom moving rail formed on the outer surface of the boom shaft, and a boom control bar which slides along the boom guide rail and the boom moving rail by a roller.

The main shaft may further include a boom guide roller formed at the upper end thereof, and the boom shaft further includes a boom wire roller formed at an end thereof, and a vertical folding angle of the boom may be adjusted by winding or unwinding a boom control wire connected to the boom guide roller and the boom wire roller, and the boom shaft may further include a boom horizontal adjustment guide roller formed at an end thereof, and a horizontal rotation angle of the boom may be adjusted by winding or unwinding a boom horizontal adjustment wire connected to the boom horizontal adjustment guide roller.

Preferably, operations of the longitudinal angle adjustment unit and the transverse angle adjustment unit of the solar power generation unit may be automatically controlled according to a measured signal value of a sun incidence angle measurement device, an operation of the vertical adjustment unit may be automatically controlled according to a measured value of an inclination angle measurement device, and a setting angle of the boom sail may be automatically controlled according to a measured signal value of a wind direction measurement device installed in the mast.

Effect of the Invention

The trimaran using natural power according to the present invention as described above can adjust the outer hull in the horizontal direction with respect to the center hull by expanding and contracting the outer hull as needed, and can freely adjust in the vertical direction with the horizontal adjustment, such that an optimal condition can be maintained during sailing and thus stability of the boat can be ensured and also optimal boarding comfort of passengers can be guaranteed.

In addition, there is an effect that, even when the azimuth and altitude of sunlight are variously changed during sailing, efficiency of power generation can be maximized by optimal sunlight irradiation by adjusting the shafts installed in the longitudinal and transverse directions.

In addition, the angle of the solar power generation module is adjusted by driving the plurality of solar power generation modules arranged in series and in parallel using only one driving motor installed in the longitudinal and transverse directions, such that it is easy to navigate and also optimal economic feasibility can be guaranteed when the trimaran is installed.

In addition, the present invention drives the main sail and the boom sail, simultaneously, due to the pair of masts supporting the main sail and the booms installed at the side surfaces of the masts, and thus has an effect that it can use maximum wind power.

In addition, the present invention uses sunlight and wind power as a power source and thus has effects that efficient long-term sailing is enabled without supply from an oil energy source, and the trimaran can be driven efficiently in spite of various change in an environment.

BEST MODE FOR EMBODYING THE INVENTION

Hereinafter, preferred embodiments of a variable trimaran using natural power according to the present invention will be described in detail with reference to the accompanying drawings.

In explaining the present invention, the front indicates the front part of the trimaran or a corresponding direction, and the rear indicates the back part of the trimaran or a corresponding direction.

Figure 1:
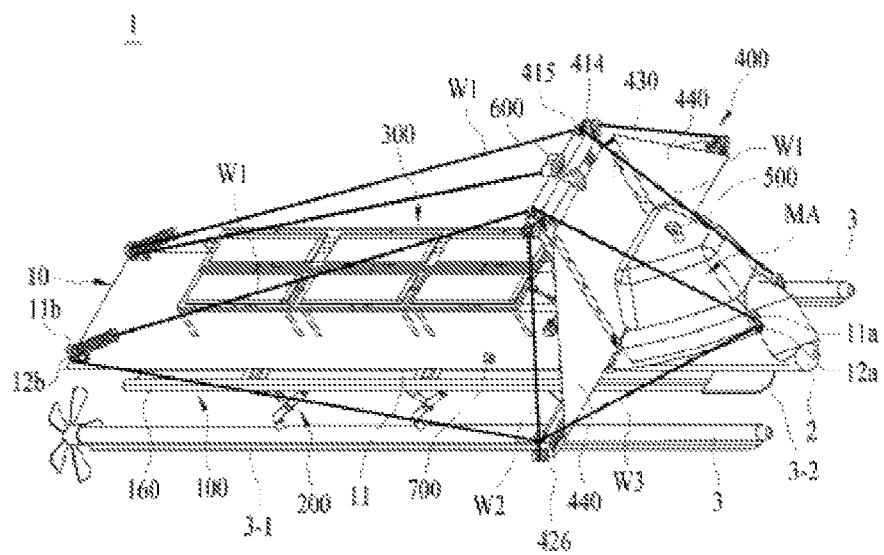
FIGS. 1 and 2 are perspective views showing a variable trimaran using natural power according to the present invention.
Figure 2:
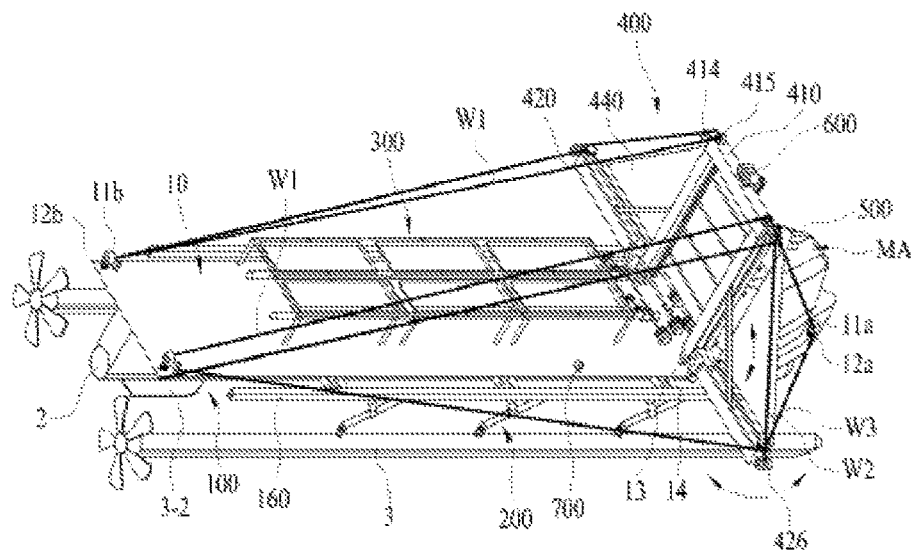

First, FIGS. 1 and 2 are perspective views showing a variable trimaran using natural power according to the present invention.

As shown in the drawings, the variable trimaran 1 using natural power according to the present invention is a trimaran having a center hull 2 and an outer hull 3, and the center hull 2 includes a deck 10 formed on a vertical portion upwardly extending therefrom and the outer hull 3 is located at a side of the center hull 2.

In this case, the outer hull 3 may be located at both sides of the center hull 2 or may be formed only at one side of the center hull 2 according to necessity.

In addition, the variable trimaran 1 using natural power is configured to have a structure that has the outer hull 3 moved from the center hull 2 and placed at a long distance therefrom, that is, at an expanded location, or has the outer hull 3 placed at a short distance from the center hull 2, that is, at a location close to the center hull 2. The variable trimaran 1 is configured to be able to be driven using sunlight and wind power, that is, natural power.

To achieve this, the variable trimaran 1 using natural power according to the present invention includes a horizontal adjustment unit 100 and a vertical adjustment unit 200, and is configured to adjust the location of the outer hull 3 according to various natural environments changing as it is driven or as needed by a passenger, to generate power from sunlight using a solar power generation unit 300, and to use power using wind power using a wind power sail unit 400.

In this case, the horizontal adjustment unit 100 is configured to adjust the location of the outer hull 3 integrally formed with a side deck bar 160 in the horizontal direction of the center hull 2 by adjusting the location of the side deck bar 160 in the horizontal direction of the deck 10.

In addition, the vertical adjustment unit 100 is configured to adjust the vertical location of the outer hull 3 with respect to a water surface as needed.

In addition, the solar power generation unit 300 is installed on the deck 10 of the center hull 2, and includes a solar power generator 310, a longitudinal angle adjustment unit 320 to adjust the longitudinal angle of the solar power generator 310, and a transverse angle adjustment unit 330 to adjust the transverse angle of the solar power generator 310.

Meanwhile, the wind power sail unit 400 includes a mast 410 which is vertically disposed to face the front part of the deck 10, a boom 420 which vertically contacts each of the lower ends of the mast 410 and is disposed to be horizontal with the deck 10, and is configured to be folded as needed, and a main sail 430 and a boom sail 440 which are secured to the mast 410 and the boom 420, respectively, to generate wind power.

Accordingly, the location of the outer hull 3 is adjusted in the horizontal direction according to driving using the horizontal adjustment unit 100 and the vertical adjustment unit 200 described above, and accordingly, the connected side deck bar 160 of the deck 10 is also adjusted in the horizontal direction, and, in addition, the expansion or contraction of the slide deck 11 connected with the side deck bar 160 is also adjusted. Therefore, the whole size of the deck 10 is adjusted as needed, such that the deck 10 can be utilized for various purposes according to a passenger's request or a situation.

In addition, when the height of waves is changed due to a violent storm, the vertical location of the outer hull 3 is adjusted by the vertical adjustment unit 200, such that a shock can be absorbed and stable sailing can be achieved.

In addition, the solar power generation unit 300 is configured to be able to use as much sunlight as possible by adjusting the angle thereof even when the position of the sun is changed as the trimaran sails, and the wind power sail unit 400 is able to efficiently use maximum wind power by adjusting the angle of the boom sail 440 using a boom control wire W2 and a boom horizontal adjustment wire W3.

Meanwhile, the variable trimaran 1 using natural power according to the present invention and having the above-described configuration is configured to automatically control the respective elements through an integrated control room of a main bridge (MA) installed at the front part of the deck 10, and the elements may be manually controlled as needed.

The configuration and operation state of each of the above-described elements will be described in detail below.

More specifically, referring back to FIGS. 1 and 2, the variable trimaran 1 of the present invention using natural power has the center hull 2 installed in the lower portion of the center of the boat and having a hollow structure, and the outer hull 3 which is expanded toward both sides of the center hull and contracted.

In this case, the center hull 2 is formed in a hollow cylinder shape and has an inner space divided by a partition. The inner partition of the center hull 2 serves to store ballast water for keeping the balance of the boat, and simultaneously, appropriately divides the center hull 2 into a portion for being filled with water for various purposes, such as drinking water, and a space filled with only air according to a driving condition.

The center hull 2 is illustrated in the form of a cylindrical shape, but may have the same effect by employing hollow structures in various forms in addition to the cylindrical shape.

A vertical portion upwardly extending from the center hull 2 forms a loading space with the deck 10 of a plate structure covering the upper portion of the vertical portion. The loading space formed by the deck 10 may be used as a space for installing control devices for adjusting all of the elements, and also, may be appropriately divided to load foods, an emergency power supply device, or the like.

Driving motors M5 and M6 (FIG. 10) for adjusting the boom sail 440 of the wind power sail unit 400 and hinging the main sail 430, and driving motors M2 and M3 for adjusting the vertical incidence direction of the solar power generation unit 300 with respect to sunlight are installed in the loading space, and these motors are controlled automatically or manually in a bridge (BA).

The bridge (MA) in which facilities necessary for operating the boat are installed is disposed in the forward direction of the deck 10, and a front guide roller 12a and a rear guide roller 12b are installed on the deck 10 to fix the boom horizontal adjustment wire W3 for adjusting the direction of the boom sail 440 installed in the wind power sail unit 400 of the present invention.

In addition, fixing instruments 13, 14 are installed on the main shaft of the main sail 430 to absorb a shock caused by a sea breeze and to maintain constant locations of the mast and the boom.

In an embodiment of the present disclosure, a pair of outer hulls 3 are arranged at both sides of the center hull 2.

Preferably, the outer hull 3 has a cylindrical shape and has an inner space filled with gas, and has an underwater buffering unit 3-1 formed on the lower portion thereof in the form of a wing widely spread toward the water surface.

In addition, the trimaran 1 may further include a surfing panel 3-2 of a plate shape formed at the front part and the rear part thereof as needed.

When the outer hull 3 submerges, the underwater buffering unit 3-1 causes strong resistance to be generated by water while ascending or descending in the vertical direction. This resistance may be adjusted at the most stable location of the sailing boat by appropriately adjusting the submergence depth of the outer hull 3.

More specifically, when the boat suddenly tilts to the left or right side while sailing, the underwater buffering unit 3-1 in the form of a wing submerges and thus prevents the whole boat from tilting unexpectedly due to serious resistance by water.

Furthermore, when waves are high, the underwater buffering unit 3-1 in the form of a wing prevents the boat from rolling by the waves due to the resistance of the underwater buffering unit 3-1 ascending and descending under water, such that passengers in the boat can have stable boarding comfort.

In addition, the surfing panel 3-2 serves to allow the boat to easily sail along wind and waves during the operation, and enables the boat 1 to sail at the most stable location with the underwater buffering unit 3-1.

Hereinafter, the structure of the variable trimaran 1 using natural power according to the present invention will be described in detail with reference to the drawings.

Figure 3:
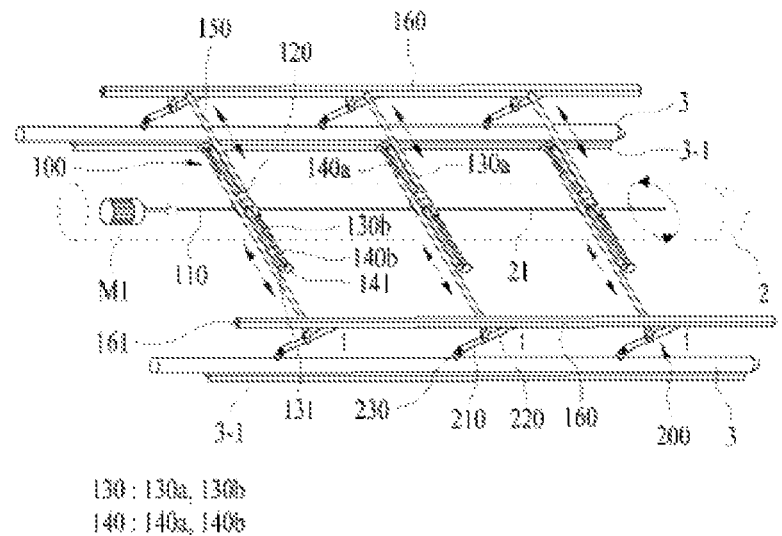
FIG. 3 is a view showing an operation state of a horizontal adjustment unit of the variable trimaran using natural power according to the present invention.
Figure 4A:
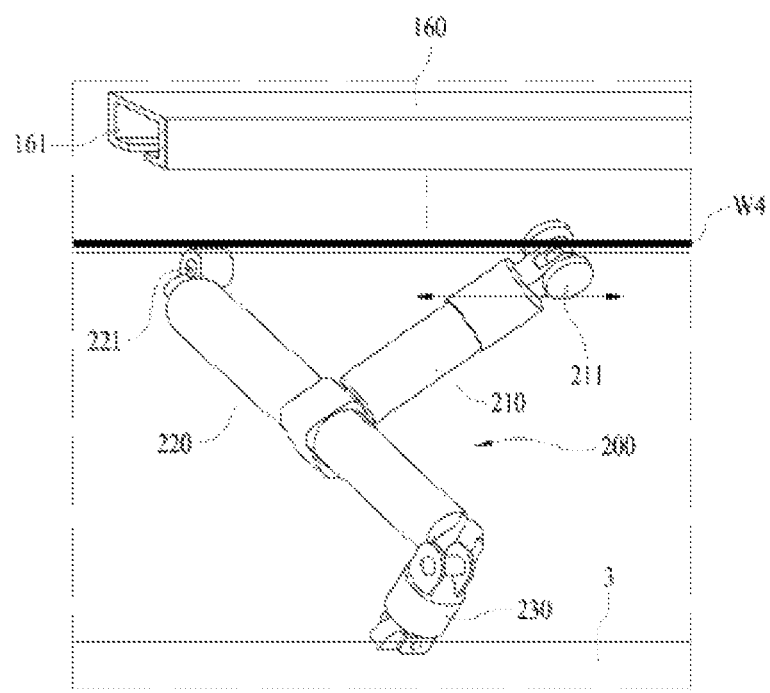
FIGS. 4(*a*) and 4(*b*) are views showing an operation state of a vertical adjustment unit of the variable trimaran using natural power according to the present invention.
Figure 4B:
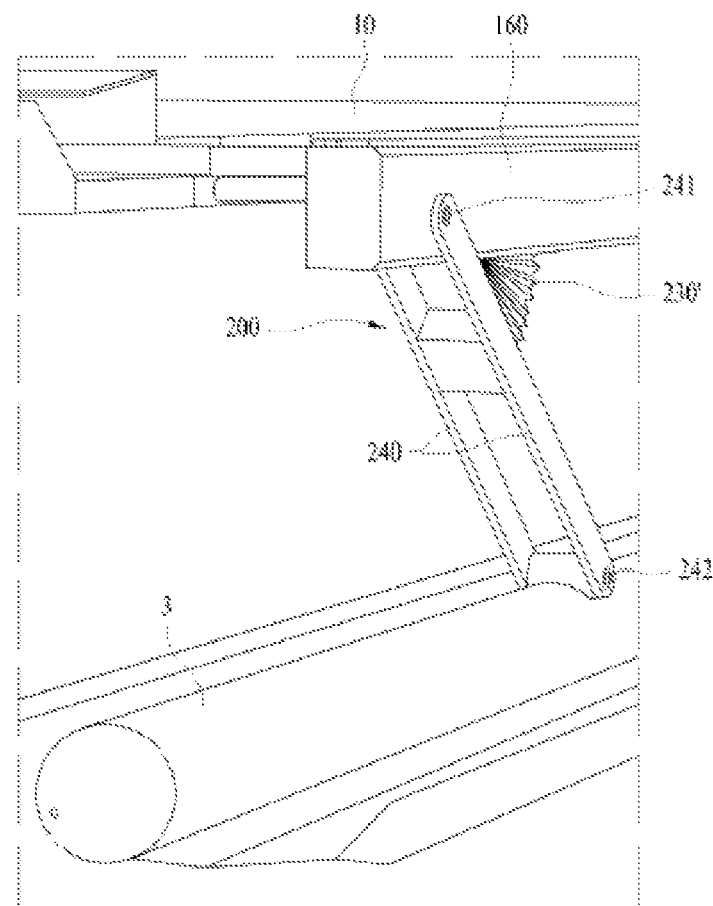

First, FIG. 3 is a view showing the operation state of the horizontal adjustment unit of the variable trimaran using natural power according to the present invention, and FIGS. 4(a) and 4(b) are views showing the operation state of the vertical adjustment unit of the variable trimaran using natural power according to the present invention.

As shown in the drawings, the variable trimaran 1 using natural power according to the present invention may adjust the location of the outer hull 3 and may expand or contract the deck 10 as needed by using the horizontal adjustment unit 100 and the vertical adjustment unit 200.

To achieve this, the horizontal adjustment unit 100 includes: a center shaft 110 which is installed in the longitudinal direction of the center hull 2, and is rotated by a center shaft driving motor Ml; a power transmission unit 120 which transmits a rotational force of the center shaft 110; a pinion shaft 130 which is installed to be perpendicular to the center shaft 110, and is rotated by receiving the rotational force of the power transmission unit 120 and has an electrically-driven gear 131 integrally formed with an end thereof; a driving shaft 140 which has a driving gear 141 engaged with the electrically-driven gear 131 and is rotated; and a guide bar 150 which linearly moves along the driving shaft 140 according to the rotation of the driving shaft 140, and has an end integrally connected with the side deck bar 160.

More specifically, the center shaft 110 penetrates through the middle of the center hull 2 and transmits the rotation power of the center shaft driving motor M1 to the power transmission unit 120.

In this case, the power transmission unit 120 includes a combination of gears such as worm or bevel gears, and transmits the rotational force of the center shaft 110 to the pinion shaft 130 located perpendicular to the center shaft 110 according to a gear structure.

As the pinion shaft 130 fastened to the output shaft of the power transmission unit 120 is rotated, the electrically-driven gear 131 fastened to an end of the pinion shaft 130 is rotated, and the rotation of the electrically-driven gear 131 is transmitted to the driving gear 141 engaged with the electrically-driven gear 131. In addition, the rotation of the driving gear 141 rotates the driving shaft 140.

In addition, the driving shaft 140 linearly moves the guide bar 150. The guide bar 150 is integrally formed with the side deck bar 160 and thus the linear movement of the guide bar 150 allows the side deck bar 160 to be expanded or contracted in the horizontal direction with reference to the center hull 2.

Preferably, the driving shaft 140 has a screw thread formed along the outer circumference thereof, and the guide bar 150 has a screw thread formed along the inner circumference thereof. The driving shaft 140 is inserted into the guide bar 150, and in this state, the guide bar 150 linearly moves along the driving shaft 140 due to securing by means of the screw thread.

In addition, preferably, the outer hull 3 integrally connected with the side deck bar 160 may be formed at both sides of the center hull 2. Therefore, the trimaran 1 has a structure for moving the outer hulls 3 at the both sides.

To achieve this, the pinion shaft 130 is divided into a first pinion shaft 130a and a second pinion shaft 130b connected to both sides of the power transmission unit 120, and the driving shaft 140 is divided into a first driving shaft 140a engaged with the electrically-driven gear 131 of the first pinion shaft 130a, and a second driving shaft 140b engaged with the second pinion shaft 130b.

In addition, each of the driving shafts is connected with each of the guide bars 150, and each of the guide bars 150 moves the side deck bar 160, thereby adjusting the location of the outer hull 3 in the horizontal direction.

Meanwhile, the vertical adjustment unit 200 includes: a vertical adjustment bar 210 which has a moving roller 211 formed at one end thereof to freely move along a guide rail 161 formed on the lower side of the side deck bar 160; a vertical control bar 220 which has one end hingedly fixed to one side of the side deck bar 160 by a pin fixing unit 221, and has the other end of the vertical adjustment bar 210 fixed thereto; and a buffering unit 230 which has one end hingedly coupled to the other end of the vertical control bar 220 and the other end fixed to the outer hull 3 so as to absorb an external shock.

More specifically, the side deck bar 160 is installed at both sides of the center hull 20 lengthways in the longitudinal direction of the outer hull 3, and the guide rail 161 is installed on the lower side of the inside of the side deck bar 160, and the moving roller 211 of the vertical adjustment bar 210 slides along the guide rail 161.

In addition, the vertical control bar 220 adjusts the vertical height of the outer hull 3. As the moving roller 211 moves on the guide rail 161 of the side deck bar 160, the vertical adjustment bar 210 is erected or is laid in the horizontal direction. Such a change in the height of the vertical adjustment bar 210 adjusts the vertical height of the vertical control bar 220, and accordingly, adjusts the vertical height of the outer hull 3 connected with the vertical control bar 220 by means of the buffering unit 230.

By adjusting the vertical height, the submergence depth under water is adjusted according to a strength of wind and waves, such that the balance of the left and right of the boat 1 can be maintained in the optimal state.

According to another embodiment, the vertical adjustment unit 200 includes: an adjustment bar 240 which has one end hingedly coupled to one side of the side deck bar 160 by means of an upper hinge 241, and the other end hingedly coupled to one side of the outer hull 3 by means of a lower hinge 242; and a buffering unit 230' which is disposed on the lower portion of the side deck bar 160 to absorb an external shock.

Accordingly, the vertical height of the outer hull 3 is adjusted to be in the optimal state by the adjustment bar 240 hingedly coupled to the outer hull 3.

The above-described buffering unit 230, 230 may be formed of one of a shock absorber or a spring, and a shock absorbing device which combines a spring and hydraulic and air cylinders as needed may be used to absorb a shock caused by wind and waves.

Accordingly, a shock suddenly applied to the outer hull 3 due to wind and waves is primarily absorbed, and the shock caused by the wind and waves is prevented from being transmitted to the body of the boat 1.

Meanwhile, a vertical control wire W4 installed along the guide rail 161 is connected to the center of the moving roller 211, and the vertical height of the outer hull 3 is arbitrarily and manually adjusted by winding or unwinding the vertical control wire W4.

In addition, the guide rail 161 of the side deck bar 160 guides the sliding movement of the moving roller 211 in an embodiment, but a rack pinion structure or a train rail-shaped structure may be applied as another embodiment, and this configuration may be selected according to a change in the size of the boat 1 or the shape of the boat 1.

In addition, the push-pull operation of the moving roller 211 is achieved by the vertical control wire W4 in an embodiment, but sprocket fastening with the roller 211 by a chain structure or a bolt shaft structure a nut structure may be applied as another embodiment. This configuration may be selected when the boat 1 should be minutely adjusted or when strong push-pull power is required in a large boat.

Meanwhile, single or multiple horizontal adjustment units 100 and single or multiple vertical adjustment units 200 may be installed according to a size of the boat 1, and this may be selected according to an attribute of the boat 1.

As described above, the variable trimaran 1 using natural power according to the present invention has the outer hull 30 disposed at the optimal location with a sea surface and appropriately adjusts a width between the outer hull 30 and the center hull 20 by using the horizontal adjustment unit 100 and the vertical adjustment unit 200, such that stability of the boat 1 can be ensured and also passengers can have good boarding comfort.

In addition, as the top surface of the deck 10 is expanded, a large space can be ensured. When a passenger wants to rest during sailing, the deck 10 may be expanded by using the horizontal adjustment unit 100, such that the passenger can do various water leisure activities such as sunbathing, swimming, fishing, or the like using the expanded space.

In addition, when wind and waves become serious during sailing, the outer hull 3 may be moved to be far from the center hull 2 or close to the center hull 2 as needed by using the horizontal adjustment unit 100, such that the stability of the boat can be more ensured, and the submergence depth of the outer hull 3 under water may be adjusted by the vertical adjustment unit 200 according to the strength of wind and waves, such that the boat can be prevented from rolling.

Figure 5:
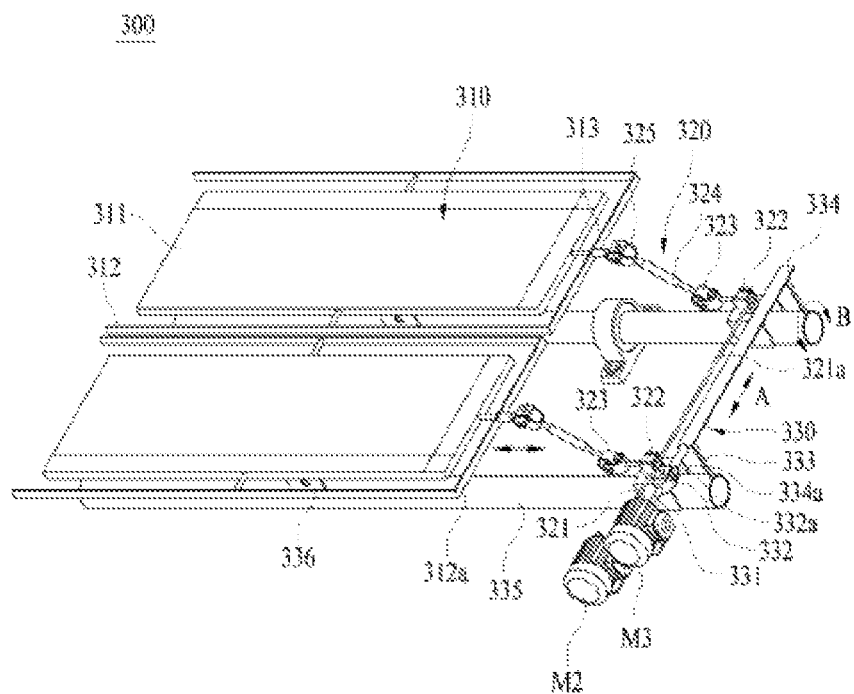
FIG. 5 is a view showing a solar power generation unit of the variable trimaran using natural power according to the present invention.
Figure 6A:
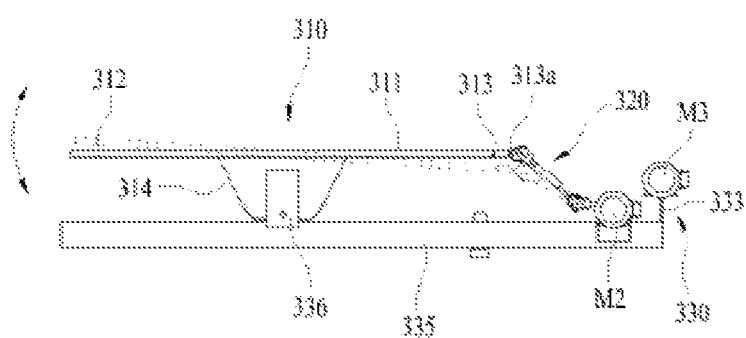
FIGS. 6(*a*) and 6(*b*) are views showing longitudinal angle adjustment of the solar power generation unit of FIG. 5.
Figure 6B:
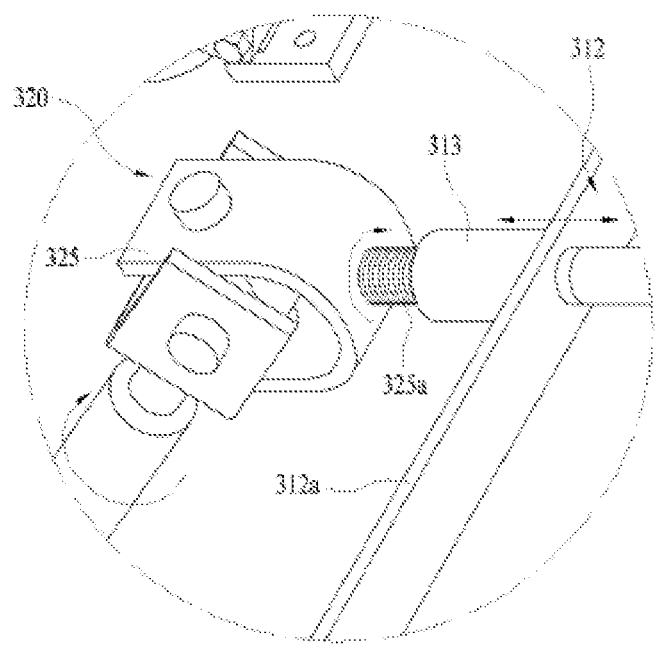
Figure 7:
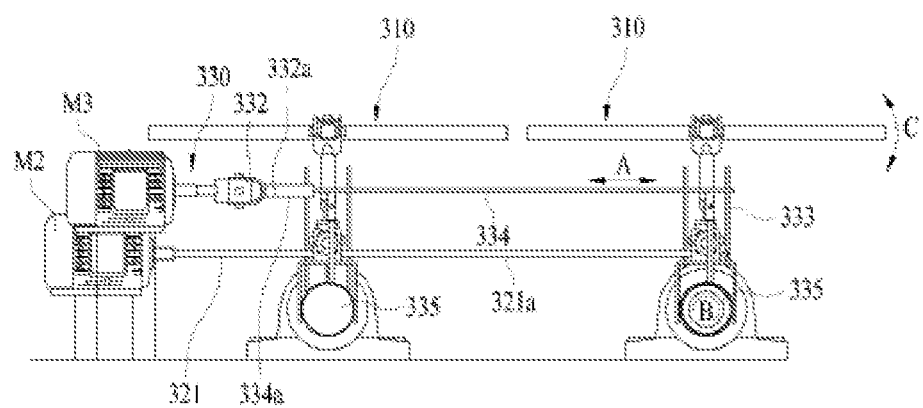
FIG. 7 is a view showing transverse angle adjustment of the solar power generation unit of FIG. 5.

FIG. 5 is a view showing the solar power generation unit of the variable trimaran using natural power according to the present invention, FIGS. 6(a) and 6(b) are views showing longitudinal angle adjustment of the solar power generation unit of FIG. 5, and FIG. 7 is a view showing transverse angle adjustment of the solar power generation unit of FIG. 5.

Hereinafter, the solar power generation unit 300 of the variable trimaran 1 using natural power according to the present invention will be described with reference to the drawings.

As shown in the drawings, the solar power generation unit 300 includes the solar power generator 310, the longitudinal angle adjustment unit 320 to adjust the longitudinal angle of the solar power generator 310, and the transverse angle adjustment unit 330 to adjust the transverse angle of the solar power generator 310.

In this case, the solar power generator 310 includes: a power generation module 311 for producing power according to irradiation of sunlight: a frame 312 for fixing the exterior of the power generation module 311; and a vertical shaft 314 which has an upper portion integrally fixed to the lower portion of the power generation module 311 or the frame 312, and a lower portion hingedly fixed.

In this case, the power generation module 311 serves to directly generate power when sunlight radiates, and a total of six power generation modules 311, three at each side of the deck 10, is illustrated. However, this may be adjusted according to a size of a boat to sail.

Preferably, the frame 312 further includes a push-pull bar 313 protruding from a front frame 312a thereof, and the longitudinal angle adjustment unit 320 is configured to linearly move the push-pull bar 313 using the rotational force of the longitudinal direction driving motor M2.

Accordingly, the solar power generator 310 may be disposed at an optimal angle toward the sun by the longitudinal angle adjustment unit 320.

More specifically, according to a preferred embodiment, the longitudinal angle adjustment unit 320 includes: a driving shaft 321 connected to the longitudinal direction driving motor M2; a power transmission unit 322 having a gear structure so as to transmit the rotational force of the driving shaft 321; a first universal joint 323 connected to the power transmission unit 322 to transmit the rotational force; and a second universal joint 325 which is connected with the first universal joint 323 by means of a connection bar 324, and is fastened to the push-pull bar 313 by means of a screw thread according to rotation to linearly move the push-pull bar 313.

In addition, the longitudinal angle adjustment unit 320 has a rotation protrusion 325a of the second universal joint 325 screwed to the push-pull bar 313 of the front frame 312a of the solar power generator 310, and the universal joints 323, 325 are rotated by the power transmission unit 322 which reduces the speed of the rotation power transmitted from the driving motor M2.

In this case, the power transmission unit 322 receives the driving power generated in the driving motor M2 through the driving shaft 321. In addition, the power transmission unit 322 has a continuous connection structure to transmit the driving power to a second driving shaft 321a and transmit it to another power transmission unit 322.

Due to the above-described configuration, the rotation of the universal joints makes the rotation protrusion 325a rotate, and accordingly, the push-pull bar 313 coupled to the rotation protrusion 325a moves forward and backward. To this end, the solar power generator 310 fastened to the frame moves forward and backward, thereby adjusting the longitudinal angle as shown in FIG. 6(a).

According to the above-described configuration, the plurality of power transmission units 322 connected with one another through the driving shafts 321, 321a are rotated only by the rotation power of the single longitudinal direction driving motor M2, thereby rotating the universal joints 323, 325. Therefore, the longitudinal angles of the plurality of solar power generator 310 can be simultaneously adjusted.

Meanwhile, the power transmission unit 322 reduces the speed of the rotational force transmitted from the driving shafts 321, 321a while changing a direction by 90 degrees by combining the plurality of gears provided therein, and transmits the rotational force to the universal joints 323, 325, and the push-pull bar 313 is pulled and pushed by the rotational force of the universal joints.

In addition, the driving shafts 321, 321a transmit the driving power to the plurality of solar power generation modules continuously arranged in parallel through the power transmission unit 322, such that the plurality of solar power generation modules can be controlled simultaneously by the single driving motor and thus solar power generation efficiency can be maximized.

Meanwhile, referring back to FIGS. 5 and 7, the transverse angle adjustment unit 330 includes: a transverse control bar 335 which has a vertical fixing unit 335a installed thereon in the vertical direction, the lower portion of the vertical shaft 314 being hingedly fixed to the vertical fixing unit 335a; a guide bar 333 protruding from an end of the transverse control bar 335 to be perpendicular to the transverse control bar 335; and a transverse bar 334 fastened to the guide bar 333 to be perpendicular to the guide bar 333. The transverse angle of the solar power generator 310 fixed to the vertical shaft 314 of the vertical fixing unit 335a is adjusted by rotating the transverse control bar 335 by linearly moving the transverse bar 334 using the rotational force of the transverse direction driving motor M3.

More specifically, the transverse angle adjustment unit 330 further includes: a driving shaft 331 connected to the transverse direction driving motor M3; and a universal joint 332 connected to the driving shaft 331 and having a transverse rotation protrusion 332a formed at an end thereof, and the transverse bar 334 further includes a transverse push-pull bar 334a which is fastened by means of a screw thread by the rotation of the transverse rotation protrusion 332a.

In this case, the transvers bar 334 installed in the transverse angle adjustment unit 330 is fastened to the entirety of the guide bar 333 of the transverse control bar 335 installed at each of two or more solar power generators 310.

Accordingly, when the transverse direction driving motor M3 installed on one side surface is rotated, the transverse rotation protrusion 332a fastened to an end of the transverse universal joint 332 moves forward or backward to or from the transvers push-pull bar 334a due to the rotational force, and thus the transverse bar 334 is moved in the direction of arrow A.

In addition, the movement of the transverse bar 334 makes the guide bar 333 perpendicularly fastened to the transverse bar 334 rotate in the direction of arrow B, such that the transverse angle of the solar power generator 310 is adjusted as desired by the transverse control bar 335.

According to the present invention, the rotation power of the transverse direction driving motor M3 and the longitudinal direction driving motor M2 is transmitted by means of the universal joints, and the rotation power is transmitted by means of a bolt and nut fastening method, which is a screwing method. However, the same function can be achieved by guiding the rotation of the transverse bar 334 or the connection bar 324 by means of a hydraulic cylinder or an air cylinder instead of using the driving motors M2, M3, and this configuration falls within the technical scope of the present invention.

In addition, the solar power generation unit 300 applied to the present invention can be easily installed since the gradient of the solar power generation module is exactly adjusted by a single independent motor in the longitudinal direction and the transverse direction, and also, there is no malfunction or breakdown even when the solar power generation unit 300 is driven for a long time after being installed. Therefore, the solar power generation unit 300 has an optimal effect as a solar power generation device for a boat to sail for a long time.

Figure 8:
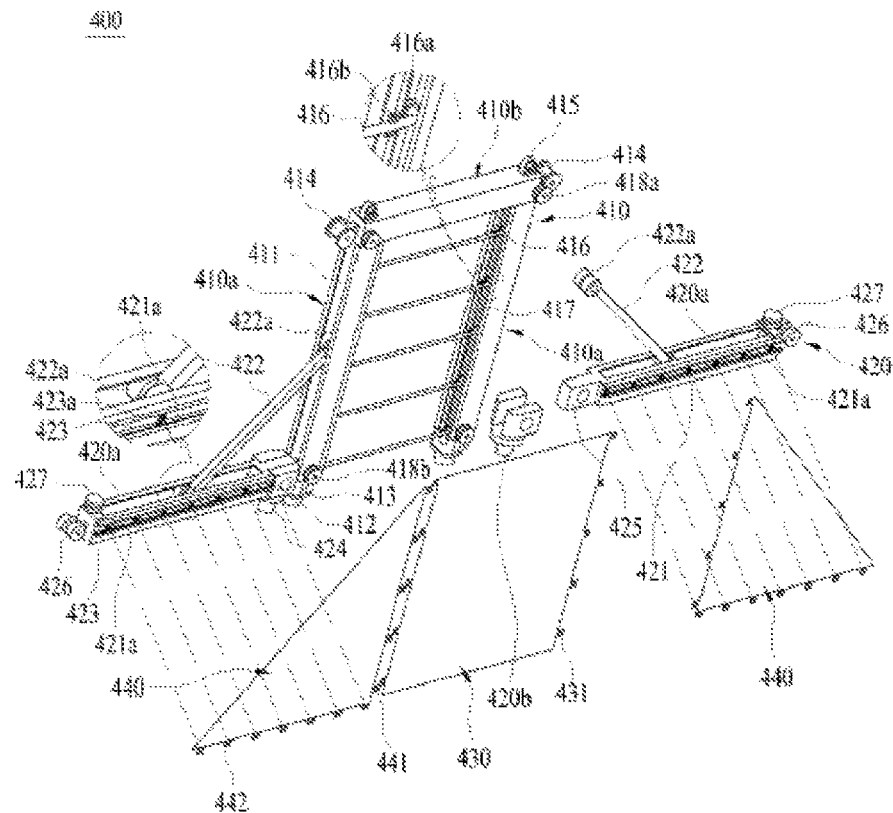
FIG. 8 is a view showing a wind power sail unit of the variable trimaran using natural power according to the present invention.
Figure 9A:
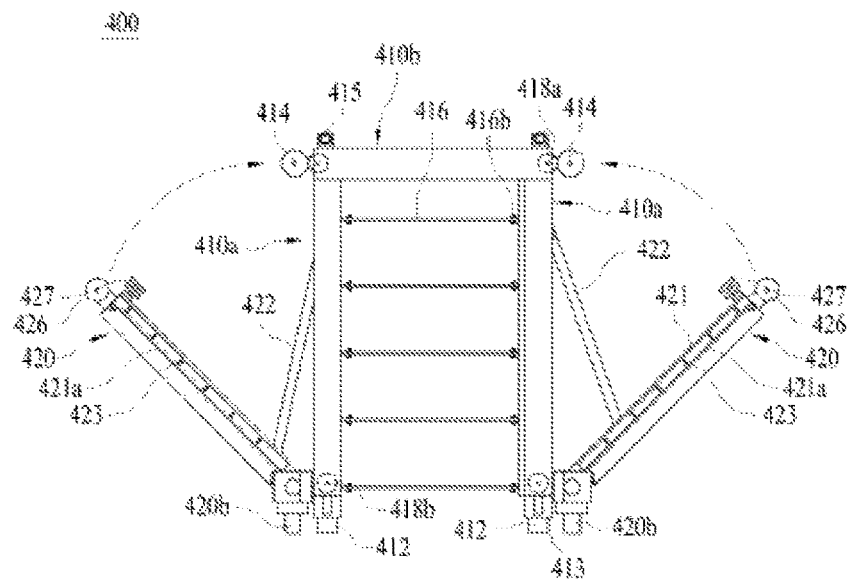
FIGS. 9(*a*) and 9(*b*) are views showing an operation state of the wind power sail unit of FIG. 8.
Figure 9B:
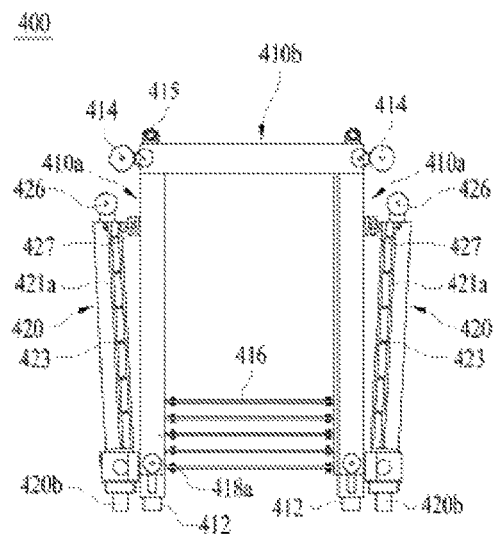
Figure 10:
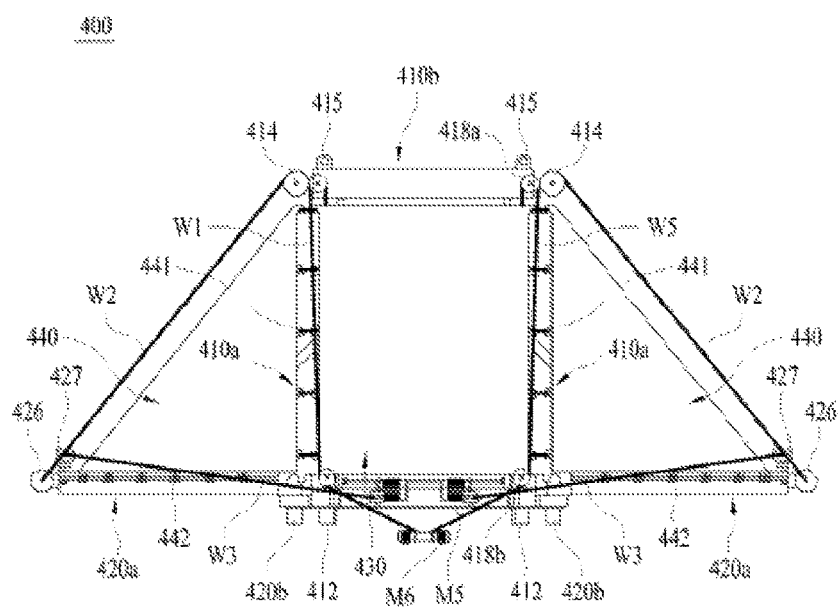
FIG. 10 is a view showing installation of the wind power sail unit of FIG. 8.

Next, FIG. 8 is a view showing the wind power sail unit of the variable trimaran using natural power according to the present invention, FIGS. 9(a) and 9(b) are views showing the operation state of the wind power sail unit of FIG. 8, and FIG. 10 is a view showing installation of the wind power sail unit of FIG. 8.

As shown in the drawings, the wind power sail unit 400 applied to the variable trimaran 1 using natural power according to the present invention includes: the mast 410 which is vertically disposed to face the front part of the deck 10; the boom 420 which perpendicularly contacts each of the lower ends of the mast 410 and is disposed to be horizontal with the deck 10, and is configured to be folded; and the main sail 430 and the boom sail 440 which are secured to the mast 410 and the boom 420, respectively.

In this case, specifically, the wind power sail unit 400 may include a pair of masts 410 which are symmetrical to each other.

In addition, the mast 410 includes a main shaft 410a and an upper shaft 410b. The main shaft 410a has a main sail guide 416 which slides along a sail guide rail 417 formed inside and is integrally formed with the main sail 430 by means of a knot hole 416a, has an upper guide roller 418a and a lower guide roller 418b formed on the outer surface thereof to guide a main sail adjustment wire W4 for adjusting an ascending movement of the main sail 430, and is fixed to the deck 10 by means of a deck fixing instrument 412 formed at the lower portion thereof.

In addition, the upper shaft 410b is configured to integrally fix the upper ends of the pair of main shafts 410a, and have a mast fixing instrument 415 formed at both ends thereof to a main shaft fixing wire W1.

The boom 420 of the wind power sail unit 400 includes a boom shaft 420a and a boom deck fixing instrument 420b. The boom deck fixing instrument 420b is fixed to the deck 10.

In addition, the boom shaft 420a has a rotation fastening instrument 425 formed at an end thereof to be rotatably fastened to the boom deck fixing instrument 420b, and has a roller guide rail 421a formed on one surface thereof and a boom sail guide roller 423 moving along the roller guide rail 421a and fastened to the boom sail 440.

In addition, preferably, the main sail 430 is configured to have side surface hanger loops 431 to be fixed to the knot holes 416a of the main sail guide 416.

In addition, the boom sail 440 further includes side surface fixing loops 441 to be connected with the side surface hanger loops 431 of the main sail 430, and lower end fixing loops 442 to be fastened to the boom sail guide rollers 423.

Meanwhile, the main shaft 410a further includes a boom guide rail 411 formed on the outer surface thereof, and the boom 420 further includes a boom moving rail 421 formed on the outer surface of the boom shaft 420a, and a boom control bar 422 which slides along the boom guide rail 411 and the boom moving rail 421 by a roller 422a.

In addition, preferably, the main shaft 410a further includes a boom guide roller 414 formed at the upper end thereof, and the boom shaft 420a further includes a boom wire roller 426 formed at an end thereof. A vertical folding angle of the boom 420 is adjusted by winding or unwinding the boom control wire W2 connected to the boom guide roller 414 and the boom wire roller 426

In addition, the boom shaft 420a further includes a boom horizontal adjustment guide roller 427 formed at an end thereof, and a horizontal rotation angle of the boom 420 is adjusted by winding or unwinding the boom horizontal adjustment wire W3 connected to the boom horizontal adjustment guide roller 427.

Meanwhile, preferably, operations of the longitudinal angle adjustment unit 320 and the transverse angle adjustment unit 330 of the solar power generation unit 300 are automatically controlled according to a measured signal value of a sun incidence angle measurement device 500. An operation of the vertical adjustment unit 200 is automatically controlled according to a measured value of an inclination angle measurement device 700. A setting angle of the boom sail 440 is automatically controlled according to a measured signal value of a wind direction measurement device 600 installed in the mast.

Referring back to FIGS. 1 and 2 and FIGS. 8 to 10, the above-described wind power sail unit 400 will be described in detail below.

The main shaft 410a has the sail guide rail 417 formed therein to allow the main sail guides 416 to slide with the main sail 43, and has the boom guide rail 411 formed on the outer surface thereof.

The sail guide rail 417 is configured to enable the main sail guide rollers 416a fastened to both ends of the main sail guide 416 to slide and move, and the boom guide rail 411 is configured to enable the boom control bar rollers 422a formed at both ends of the boom control bar 422 to slide and move.

In addition, the main shaft 410a has the upper and lower guide rollers 418a, 418b installed on the front side surface or rear side surface thereof to guide the main sail adjustment wire W5 for adjusting the ascending movement of the main sail 430. The ascending and descending movements of the main sail 430 are adjusted by pulling and releasing the main sail adjustment wire W5.

The main sail guide 416 has the knot hole 416b to be integrally connected with the main sail 430 and ascend with the main sail 430 in the vertical direction, and is connected with the main sail 430 in a normal knotting method and is moved according to the ascending and descending movements of the main sail 430.

The main sail 430 has the side surface hanger loops 431 formed at both side ends thereof to be fastened to the side surface fixing loops 441 formed on the side surface of the boom sail 440, and the side surface hanging loops 431 are tied to the side surface fixing loops 441 of the boom sail 440 by means of knots, such that the boom sail 440 is moved in the vertical direction according to the vertical movement of the main sail 430.

The boom sail 440 is fastened to the side surface hanger loops 431 of the main sail, and has the lower end fixing loops 442 formed on the lower end thereof to be fastened to the boom sail guide rollers 423.

In addition, the boom shaft 420*a* has the boom moving rail 421 formed therein to allow one end of the boom control bar 422 to slide thereon, and has the rotation fastening instrument 425 formed at the lower end thereof to be rotatably fastened to the boom deck fixing instrument 420*b*.

The boom shaft 420*a* has the boom wire roller 426 formed at the outer end thereof. One end of the boom control wire W2 is fixed to the boom wire roller 426 and then the boom control wire W2 is guided to the boom guide roller 414 of the upper shaft 410*b* and is configured to be wound and unwound by the rotation power of the boom guide motor M5 installed in the body of the boat 1.

The boom shaft 420*a* has the horizontal adjustment guide roller 427 formed at the outer end thereof separately from the boom wire roller 426.

The boom horizontal adjustment wire W3, which passes through the front guide roller 12*a* and the rear guide roller 12*b* installed at the front and the rear of the deck 10, is fastened to the horizontal adjustment guide roller 427.

In this case, the boom horizontal adjustment wire W3 is pulled and released by another boom horizontal adjustment motor installed in the body of the boat, such that the boom shaft 420*a* is rotated by a desired angle with reference to the boom deck fixing instrument 420*b*.

The boom shaft 420*a* has the roller guide rail 421*a* formed on the front surface or rear surface thereof to allow the boom sail guide rollers 423, which are fastened to the lower end fixing loops 442 installed at the lower end of the boom sail 440 by means of knots, to slide thereon.

Preferably, the boom sail guide rollers 423 protrude in the form of a bar and are tied to the knot holes 423*a* with the lower end of the boom sail 440 in a normal knotting method, thereby pulling the lower end of the boom sail.

The plurality of boom sail guide rollers 423 are arranged, and preferably, the boom sail guide rollers 423 installed at the outermost side are coupled with a boom sail adjustment wire to interwork with the main sail adjustment wire W5 for adjusting the folding of the main sail 430.

The boom sail adjustment wire is connected with the main sail adjustment wire W5, and is folded with the main sail 430 by the winding or unwinding operation of the main sail adjustment motor M6.

According to the above-described configuration, the boom shaft 420*a* of the boom sail 440 is disposed at both sides of the main sail by an optimal angle according to the advancing of the boat and a wind direction, such that maximum wind power can be utilized.

As described above, the variable trimaran 1 using natural power according to the present invention can be driven using natural power using the solar power generation unit 300 and the wind power sail unit 400, and is configured to have the locations of the outer hulls 3 adjusted by using the horizontal adjustment unit 100 and the vertical adjustment unit 200 as needed.

Referring back to FIGS. 1 and 2, the trimaran is controlled through the integrated control room installed at the bridge (MA) of the present invention.

When an appropriate wind for driving the boat blows while the variable trimaran 1 using natural power according to the present invention sails at a predetermined speed after starting, the direction and the speed of the wind are measured and an installation angle of the boom sail 440 is calculated in a central control device (not shown).

When an operation signal is given to the boom guide motor based on the calculated information, the boom shaft 420*a* is expanded to spread the boom sail 440.

The above-described preparing operation of the boom sail, a current direction and an angle of sunlight are measured by a measuring device (not shown), and the respective motors are driven by giving operations signals regarding the longitudinal direction driving motor M2 and the transverse direction driving motor M3 of the solar power generation device.

Due to the above-described operation, the solar power generation unit 300 is disposed at such an angle with respect to the sun that it can achieve the most efficient power generation.

In addition, when the boom shaft 420*a* is completely expanded, the control device ends the operation signal for the boom guide motor in response to an expansion end signal of the boom shaft, and gives an operation signal to the main sail adjustment motor M6. According to the operation signal for the main sail adjustment motor, operation power is supplied to the main sail adjustment motor. Therefore, the boom sail is expanded with the ascending movement of the main sail 430.

In order to maintain the direction of the wind and the direction of the boom sail in the optimal state for sailing of the boat while the main sail and the boom sail are expanded, an operation signal is calculated again based on an optimum angle for a current direction of a wind, and is transmitted.

When the boom sail is disposed at a target angle according to the operation signal, sailing is performed using wind power.

Various substitutions, modifications, and changes can be made to the above-described present invention by a person skilled in the art without departing from the technical idea of the present invention, and thus the present invention is not limited by the above-described embodiments and the accompanying drawings.

What is claimed is:

1. A variable trimaran using natural power, which has a center hull having a deck, and an outer hull located at the side of the center hull, the variable trimaran comprising:
    a horizontal adjustment unit for adjusting the location of the outer hull with respect to the center hull by adjusting a location of a side deck bar of the deck in a horizontal direction;
    a vertical adjustment unit for adjusting the vertical location of the outer hull with respect to a water surface;
    a solar power generation unit which is installed on the deck of the center hull, and comprises a solar power generator, a longitudinal angle adjustment unit for adjusting a longitudinal angle of the solar power generator, and a transverse angle adjustment unit for adjusting a transverse angle of the solar power generator; and
    a wind power sail unit which comprises a mast vertically disposed to face a front part of the deck, a boom perpendicularly contacting each of the lower ends of the mast and disposed to be horizontal to the deck, and configured to be folded, and a main sail and a boom sail fastened to the mast and the boom, respectively.

2. The variable trimaran of claim 1, wherein the horizontal adjustment unit comprises:
   a center shaft which is installed in a longitudinal direction of the center hull, and is rotated by a center shaft driving motor;
   a power transmission unit which transmits a rotational force of the center shaft;
   a pinion shaft which is installed to be perpendicular to the center shaft, and is rotated by receiving the rotational force of the power transmission unit and has an electrically-driven gear integrally formed with an end thereof;
   a driving shaft which has a driving gear engaged with the electrically-driven gear and is rotated; and
   a guide bar which linearly moves along the driving shaft according to the rotation of the driving shaft, and has an end integrally connected with the side deck bar.

3. The variable trimaran of claim 1, wherein the vertical adjustment unit comprises:
   a vertical adjustment bar which has a moving roller formed thereon to freely move along a guide rail formed on the lower side of the side deck bar;
   a vertical control bar which has one end hingedly fixed to one side of the side deck bar by a pin fixing unit, and has the other end of the vertical adjustment bar fixed thereto; and
   a buffering unit which has one end hingedly coupled to the vertical control bar and the other end fixed to the outer hull so as to absorb an external shock.

4. The variable trimaran of claim 3, wherein a vertical control wire installed along the guide rail is connected to the center of the moving roller, and a vertical height of the outer hull is adjusted by winding or unwinding the vertical control wire.

5. The variable trimaran of claim 1, wherein the vertical adjustment unit comprises:
   an adjustment bar which has one end hingedly coupled to one side of the side deck bar by means of an upper hinge, and has the other end hingedly coupled to one side of the outer hull by means of a lower hinge; and
   a buffering unit which is disposed on the lower portion of the side deck bar to absorb an external shock.

6. The variable trimaran of claim 1, wherein the solar power generator comprises:
   a power generation module for producing power according to irradiation of sunlight;
   a frame for fixing the exterior of the power generation module; and
   a vertical shaft which has an upper portion integrally fixed to the lower portion of the power generation module or the frame, and a lower portion hingedly fixed.

7. The variable trimaran of claim 6, wherein:
   the frame further comprises a push-pull bar protruding from a front frame thereof, and
   the longitudinal angle adjustment unit is configured to linearly move the push-pull bar using the rotational force of a longitudinal direction driving motor.

8. The variable trimaran of claim 7, wherein the longitudinal angle adjustment unit comprises:
   a driving shaft connected to the longitudinal direction driving motor;
   a power transmission unit having a gear structure so as to transmit a rotational force of the driving shaft;
   a first universal joint connected to the power transmission unit to transmit the rotational force; and
   a second universal joint which is connected with the first universal joint by means of a connection bar, and is fastened to the push-pull bar by means of a screw thread according to rotation to linearly move the push-pull bar.

9. The variable trimaran of claim 6, wherein the transverse angle adjustment unit comprises:
   a transverse control bar which has a vertical fixing unit installed thereon in the vertical direction, the lower portion of the vertical shaft being hingedly fixed to the vertical fixing unit;
   a guide bar protruding from an end of the transverse control bar to be perpendicular to the transverse control bar; and
   a transverse bar fastened to the guide bar to be perpendicular to the guide bar, and
   wherein the transverse angle of the solar power generator fixed to the vertical shaft of the vertical fixing unit is adjusted by rotating the transverse control bar by linearly moving the transverse bar using a rotational force of a transverse direction driving motor.

10. The variable trimaran of claim 9, wherein the transverse angle adjustment unit further comprises:
    a driving shaft connected to the transverse direction driving motor; and
    a universal joint connected to the driving shaft and having a transverse rotation protrusion formed at an end thereof, and
    wherein the transverse bar further comprises a transverse push-pull bar fastened by means of a screw thread by the rotation of the transverse rotation protrusion.

11. The variable trimaran of claim 1, wherein the mast of the wind power sail unit comprises:
    a pair of main shafts which are symmetrical to each other, have a main sail guide sliding along a sail guide rail formed inside and integrally formed with the main sail by means of a knot hole, have an upper guide roller and a lower guide roller formed on the outer surface thereof to guide a main sail adjustment wire for adjusting an ascending movement of the main sail, and are fixed to the deck by means of a deck fixing instrument formed at the lower portion thereof; and
    an upper shaft which is configured to integrally fix the upper ends of the pair of main shafts, and have a mast fixing instrument formed at both ends thereof to fix a main shaft fixing wire.

12. The variable trimaran of claim 11, wherein the boom of the wind power sail unit comprises:
    a boom deck fixing instrument fixed to the deck; and
    a boom shaft which has a rotation fastening instrument formed at an end thereof to be rotatably fastened to the boom deck fixing instrument, and has a roller guide rail formed on one surface thereof and a boom sail guide roller moving along the roller guide rail and fastened to the boom sail.

13. The variable trimaran of claim 12, wherein:
    the main shaft further comprises a boom guide rail formed on the outer surface thereof, and
    the boom further comprises a boom moving rail formed on the outer surface of the boom shaft, and a boom control bar which slides along the boom guide rail and the boom moving rail by a roller.

14. The variable trimaran of claim 12, wherein the main shaft further comprises:
    a boom guide roller formed at the upper end thereof, and the boom shaft further comprises a boom wire roller formed at an end thereof, and a vertical folding angle of the boom is adjusted by winding or unwinding a boom control wire connected to the boom guide roller and the boom wire roller, and wherein the boom shaft further comprises a boom horizontal adjustment guide roller formed at an end thereof, and a horizontal rotation angle of the boom is adjusted by winding or unwinding a boom horizontal adjustment wire connected to the boom horizontal adjustment guide roller.

15. The variable trimaran of claim 1, wherein:

operations of the longitudinal angle adjustment unit and the transverse angle adjustment unit of the solar power generation unit are automatically controlled according to a measured signal value of a sun incidence angle measurement device, an operation of the vertical adjustment unit is automatically controlled according to a measured value of an inclination angle measurement device, and a setting angle of the boom sail is automatically controlled according to a measured signal value of a wind direction measurement device installed in the mast.

* * * * *